US010599077B2

(12) United States Patent
Iwasaki

(10) Patent No.: US 10,599,077 B2
(45) Date of Patent: Mar. 24, 2020

(54) IMAGE FORMING APPARATUS AND IMAGE HEATING APPARATUS THAT CONTROL HEATING AMOUNTS OF A REGION IN WHICH AN IMAGE IS FORMED AND A REGION IN WHICH AN IMAGE IS NOT FORMED

(71) Applicant: CANON KABUSHIKI KAISHA, Tokyo (JP)

(72) Inventor: Atsushi Iwasaki, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/378,180

(22) Filed: Apr. 8, 2019

(65) Prior Publication Data

US 2019/0235424 A1 Aug. 1, 2019

Related U.S. Application Data

(63) Continuation of application No. 15/632,870, filed on Jun. 26, 2017, now Pat. No. 10,268,144.

(30) Foreign Application Priority Data

Jul. 1, 2016 (JP) ................................ 2016-131665

(51) Int. Cl.
*G01V 3/08* (2006.01)
*G03G 15/20* (2006.01)
(Continued)

(52) U.S. Cl.
CPC ......... *G03G 15/2046* (2013.01); *G03G 13/20* (2013.01); *G03G 15/2017* (2013.01);
(Continued)

(58) Field of Classification Search
CPC ........... G03G 15/2042; G03G 15/2053; G03G 2215/2035; G03G 15/2017
(Continued)

(56) References Cited

U.S. PATENT DOCUMENTS 6,701,102 B2 3/2004 Hasegawa et al.
7,193,181 B2 3/2007 Makihira et al.
(Continued)

FOREIGN PATENT DOCUMENTS

JP H06-95540 A 4/1994
JP 2007-271870 A 10/2007
(Continued)

OTHER PUBLICATIONS

Extended European Search Report dated Nov. 29, 2017, issued in European Patent Application No. 17178952.2.
(Continued)

*Primary Examiner* — Walter L Lindsay, Jr.
*Assistant Examiner* — Frederick Wenderoth
(74) *Attorney, Agent, or Firm* — Venable LLP

(57) ABSTRACT

An image heating apparatus has a heater to heat an image formed on a recording material. The heater has a plurality of heat generating elements. A control portion controls electrical power supplied to the plurality of heat generating elements. The control portion respectively sets a heating amount with respect to a region in which an image is formed and a heating amount with respect to a region in which an image is not formed in a single sheet of the recording material. The control portion is further configured to at least set the heating amount with respect to the region in which the image is not formed when the recording material is heavy paper to become less than the heating amount with respect to the region in which the image is not formed when the recording material is plain paper.

32 Claims, 11 Drawing Sheets

(51) Int. Cl.
*G03G 13/20* (2006.01)
*G03G 21/20* (2006.01)

(52) U.S. Cl.
CPC ..... *G03G 15/2028* (2013.01); *G03G 15/2042* (2013.01); *G03G 15/2053* (2013.01); *G03G 21/206* (2013.01); *G03G 2215/2035* (2013.01)

(58) Field of Classification Search
USPC .......................................................... 399/334
See application file for complete search history.

(56) References Cited

U.S. PATENT DOCUMENTS

| | | | |
|---|---|---|---|
| 7,283,145 | B2 | 10/2007 | Kato et al. |
| 8,433,212 | B2 | 4/2013 | Ono |
| 9,069,302 | B2 | 6/2015 | Samei et al. |
| 9,152,105 | B2 | 10/2015 | Kishi |
| 9,304,454 | B2 | 4/2016 | Suganuma et al. |
| 9,335,679 | B2 | 5/2016 | Tanaka et al. |
| 9,335,709 | B2 | 5/2016 | Iwasaki et al. |
| 9,389,553 | B2 | 7/2016 | Yamamoto et al. |
| 9,665,048 | B2 | 5/2017 | Iwasaki et al. |
| 10,054,882 | B2 | 8/2018 | Nomura et al. |
| 10,114,318 | B2 | 10/2018 | Sako et al. |
| 10,185,258 | B2 | 1/2019 | Sako et al. |
| 2002/0118977 | A1 | 8/2002 | Hasegawa et al. |
| 2010/0196039 | A1 | 8/2010 | Ono |
| 2014/0027441 | A1 | 1/2014 | Mine et al. |
| 2014/0219672 | A1 | 8/2014 | Samei et al. |
| 2015/0050038 | A1 | 2/2015 | Suganuma et al. |
| 2015/0168886 | A1 | 6/2015 | Tanaka et al. |
| 2015/0286174 | A1 | 10/2015 | Yamamoto et al. |

FOREIGN PATENT DOCUMENTS

| | | | |
|---|---|---|---|
| JP | 2014-178427 | A | 9/2014 |
| JP | 2015-036771 | A | 2/2015 |
| JP | 2015-064548 | A | 4/2015 |

OTHER PUBLICATIONS

Chinese Office Action issued in corresponding Chinese Application No. 201710500044.4 dated Dec. 10, 2019.

FIG. 7

| | | Ta | Tp | ΔT | DISTORTION OF RECORDING MATERIAL P | AVERAGE POWER CONSUMPTION PER SHEET |
|---|---|---|---|---|---|---|
| $P_A$ | EMBODIMENT 1 | 160°C | 140°C | 20°C | A | 660J |
| | COMPARATIVE EXAMPLE | 160°C | 120°C | 40°C | U | 600J |
| $P_B$ | EMBODIMENT 1 | 180°C | 140°C | 40°C | A | 750J |
| $P_C$ | EMBODIMENT 1 | 180°C | 120°C | 60°C | A | 850J |
| | COMPARATIVE EXAMPLE | 180°C | 140°C | 40°C | A | 1050J |

FIG. 9

| DETECTION RESULT (BASIS WEIGHT) | ≦60g/m² | ≦70g/m² | ≦80g/m² | ≦100g/m² | ≦120g/m² | ≦150g/m² | ≦180g/m² | 180g/m²< |
|---|---|---|---|---|---|---|---|---|
| HEATING MODE | THIN PAPER MODE Ta=160℃、⊿T=20℃ | | PLAIN PAPER MODE Ta=180℃、⊿T=40℃ | | | HEAVY PAPER MODE Ta=180℃、⊿T=60℃ | | |
| dTa1 | 0℃ | +5℃ | −5℃ | 0℃ | +5℃ | −5℃ | 0℃ | +5℃ |
| dT1 | 0℃ | +5℃ | −10℃ | 0℃ | +10℃ | −5℃ | 0℃ | +5℃ |
| Ta'=Ta+dTa1 | 160℃ | 165℃ | 175℃ | 180℃ | 185℃ | 175℃ | 180℃ | 185℃ |
| ⊿T'=⊿T+dT1 | 20℃ | 25℃ | 30℃ | 40℃ | 50℃ | 55℃ | 60℃ | 65℃ |

FIG. 10A

| RELATIVE HUMIDITY RH | ≦30% | 60% | 90%≦ |
|---|---|---|---|
| dT2 | +10°C | 0°C | −10°C |

FIG. 10B

| ATMOSPHERIC TEMPERATURE T0 | ≦10°C | 15°C | 23°C | 30°C≦ |
|---|---|---|---|---|
| dTa2 | +10°C | +5°C | 0°C | −5°C |

IMAGE FORMING APPARATUS AND IMAGE HEATING APPARATUS THAT CONTROL HEATING AMOUNTS OF A REGION IN WHICH AN IMAGE IS FORMED AND A REGION IN WHICH AN IMAGE IS NOT FORMED

This application is a continuation of U.S. patent application Ser. No. 15/632,870, filed on Jun. 26, 2017, which claims the benefit of Japanese Patent Application No. 2016-131665, filed on Jul. 1, 2016, which are hereby incorporated by reference herein in their entireties.

BACKGROUND OF THE INVENTION

Field of the Invention

The present invention relates to an image forming apparatus, such as a copier and a printer, which uses an electrophotographic system or an electrostatic recording system. The present invention also relates to an image heating apparatus, such as a fixing unit mounted to an image forming apparatus, and a gloss applying apparatus that reheats a toner image fixed to a recording material in order to improve a gloss value of the toner image.

Description of the Related Art

A system that selectively heats an image section formed on a recording material in an image heating apparatus, such as a fixing unit and a gloss applying apparatus, used in an electrophotographic image forming apparatus (hereafter, an image forming apparatus), such as a copier and a printer, is proposed in order to meet demands for power saving (Japanese Patent Application Laid-open No. H6-95540). In this system, a heating region divided in plurality in a direction (also referred to as a longitudinal direction) perpendicular to a paper-passing direction of the recording material is set, and heat generating elements that heat each heating region are provided in plurality in the longitudinal direction. In addition, based on image information of an image formed in each heating region, an image section (a region in which an image is formed on the recording material) is selectively heated by a corresponding heat generating elements. Furthermore, a method of adjusting heating conditions in accordance with image information to achieve power saving (Japanese Patent Application Laid-open No. 2007-271870) is also proposed.

Using the methods described in Japanese Patent Application Laid-open No. H6-95540 and Japanese Patent Application Laid-open No. 2007-271870 to perform optimal heating control on an image in each heating region produces a high power-saving effect. It was found, however, that when heating amounts differ according to regions in one sheet of recording material, distortion of the recording material may occur and may cause a decline in stackability of the recording material when discharged on to a paper discharge tray.

SUMMARY OF THE INVENTION

An object of the present invention is to provide an image heating apparatus capable of suppressing deformation of recording material.

Another object of the present invention is to provide an image heating apparatus capable of suppressing deformation of recording material while suppressing power consumption.

In one aspect, the present invention provides an image heating apparatus that heats an image formed on a recording material, the image heating apparatus comprising a heater, the heater having a plurality of heat generating elements arranged in a direction orthogonal to a conveying direction of the recording material, and a control portion that controls electrical power to be supplied to the plurality of heat generating elements, the control portion being capable of individually controlling the plurality of heat generating elements, wherein the control portion respectively sets a heating amount with respect to a region in which an image is formed, and a heating amount with respect to a region in which an image is not formed in a single sheet of the recording material, and a difference between the heating amount with respect to the region in which an image is formed and the heating amount with respect to the region in which an image is not formed differs depending on a type of the recording material.

In another aspect, the present invention provides an image forming apparatus comprising an image forming portion that forms an image on a recording material, and a fixing portion that fixes the image formed on the recording material to the recording material, wherein the fixing portion is the image heating apparatus.

In yet another aspect, the present invention provides an image heating apparatus that heats an image formed on a recording material, the image heating apparatus comprising a heater, the heater having a plurality of heat generating elements arranged in a direction orthogonal to a conveying direction of the recording material, and a control portion that controls electrical power to be supplied to the plurality of heat generating elements, the control portion being capable of individually controlling the plurality of heat generating elements, wherein the image heating apparatus is capable of setting at least a thin paper mode and a plain paper mode, the control portion respectively sets a heating amount with respect to a region in which an image is formed and a heating amount with respect to a region in which an image is not formed in a single sheet of the recording material, and a difference between the heating amount with respect to the region in which an image is formed and the heating amount with respect to the region in which an image is not formed differs between the thin paper mode and the plain paper mode.

In still another aspect, the present invention provides an image forming apparatus comprising an image forming portion that forms an image on a recording material, and a fixing portion that fixes the image formed on the recording material to the recording material, wherein the fixing portion is the image heating apparatus.

Further features of the present invention will become apparent from the following description of exemplary embodiments with reference to the attached drawings.

BRIEF DESCRIPTION OF THE DRAWINGS

FIG. 7 shows a result of an assessment of distortion of a recording material and a result of a measurement of average power consumption according to Embodiment 1.

FIG. 9 is a table of heating modes and temperature correction amounts according to Embodiment 2.

FIGS. 10A and 10B are tables of temperature correction amounts according to Embodiment 3.

DESCRIPTION OF THE EMBODIMENTS

Hereafter, a description will be given, with reference to the drawings, of embodiments of the present invention. The sizes, materials, shapes, their relative arrangements, or the like, of constituents described in the embodiments may, however, be appropriately changed according to the configurations, various conditions, or the like, of apparatuses to which the invention is applied. Therefore, the sizes, materials, shapes, their relative arrangements, or the like, of the constituents described in the embodiments do not intend to limit the scope of the invention to the following embodiments.

Embodiment 1

1. Configuration of Image Forming Apparatus

Figure 1:
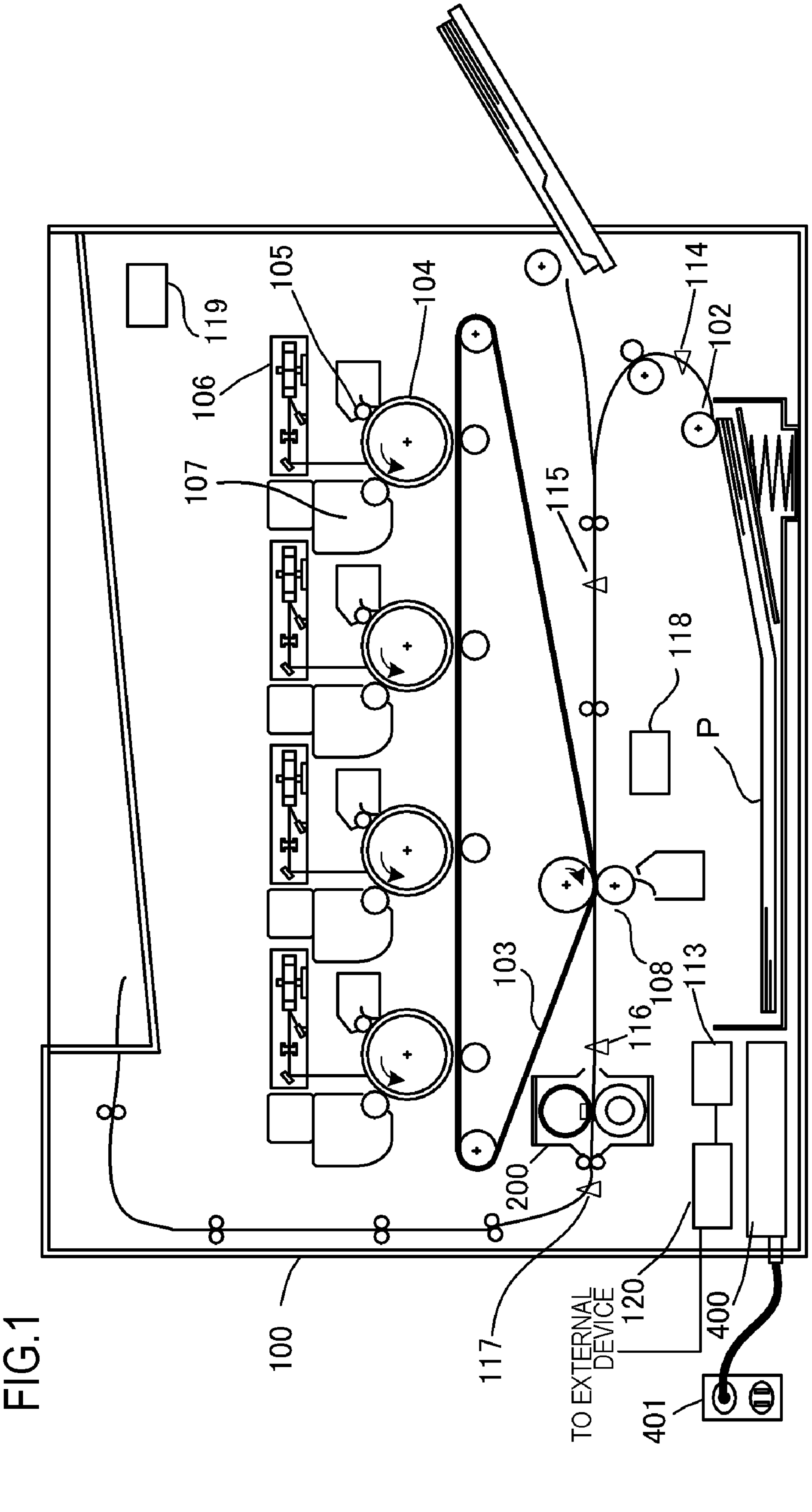
FIG. 1 is a schematic sectional view of an image forming apparatus 100 according to an embodiment of the present invention.

FIG. 1 is a configuration diagram of an image forming apparatus adopting an electrophotographic system according to an embodiment of the present invention. Examples of image forming apparatuses to which the present invention is applicable include copiers, printers, and the like, that utilize an electrophotographic system or an electrostatic recording system, and a case in which the present invention is applied to a laser printer will be described below.

An image forming apparatus 100 includes a video controller 120 and a control portion 113. As an acquiring unit that acquires information regarding a type of a recording material P, and the like, and information on an image formed on the recording material P, the video controller 120 receives and processes image information and print instructions transmitted from an external device, such as a personal computer. The control portion 113 is connected to the video controller 120 and controls respective units constituting the image forming apparatus 100 in accordance with instructions from the video controller 120. When the video controller 120 receives a print instruction from the external device, image formation is executed through the following operations.

The image forming apparatus 100 feeds a recording material P with a feeding roller 102 and conveys the recording material P toward an intermediate transfer member 103. A photosensitive drum 104 is rotationally driven counter-clockwise at a prescribed speed by power of a drive motor (not shown) and is uniformly charged by a primary charger 105 during the rotation process. A laser beam modulated in correspondence with an image signal is output from a laser beam scanner 106 and performs selective scanning exposure on the photosensitive drum 104 to form an electrostatic latent image. Reference numeral 107 denotes a developing device that causes powder toner, as a developer, to adhere to the electrostatic latent image to make the electrostatic latent image visible as a toner image (a developer image). The toner image formed on the photosensitive drum 104 is primarily transferred onto the intermediate transfer member 103 that rotates while in contact with the photosensitive drum 104.

In this case, one each of the photosensitive drum 104, the primary charger 105, the laser beam scanner 106, and the developing device 107 is arranged for each of the four colors of cyan (C), magenta (M), yellow (Y), and black (K). Toner images corresponding to the four colors are sequentially transferred onto the intermediate transfer member 103 so as to overlap with one another by a same procedure. The toner images transferred onto the intermediate transfer member 103 are secondarily transferred onto the recording material P by a transfer bias applied to a transfer roller 108 at a secondary transfer unit formed by the intermediate transfer member 103 and the transfer roller 108. The configuration involved with forming an unfixed image on the recording material P corresponds to the image forming portion. Subsequently, the toner images are fixed when the fixing apparatus 200, as an image heating apparatus, applies heat and pressure to the recording material P, and the recording material P is discharged to the outside as an image-formed article.

The control portion 113 manages a conveyance state of the recording material P using a conveyance sensor 114, a resist sensor 115, a pre-fixing sensor 116, and a fixing discharge sensor 117 arranged on a conveyance path of the recording material P. In addition, the control portion 113 includes a storage unit that stores a temperature control program and a temperature control table of the fixing apparatus 200. A control circuit 400, as heater driving means connected to a commercial AC power supply 401, supplies power to the fixing apparatus 200.

Moreover, the present embodiment relates to an image forming apparatus 100 in which a maximum paper-passing width in a direction perpendicular to a conveying direction of the recording material P is 216 mm and embodiment is capable of printing 40 sheets per minute of plain paper with a LETTER size (216 mm×279 mm) at a conveyance speed of 220 mm/sec.

In addition, with the image forming apparatus 100 according to the present embodiment, information regarding a print mode for passing the recording material P is transmitted as one of the print instructions from an external device, such as a host computer. Alternatively, a print mode can be selected as appropriate on an operating panel of the image forming apparatus 100.

A print mode refers to a mode that can be set by a user to realize optimal print output in accordance with a type of the recording material P. In the following description, a print mode related to image heating will be referred to as a heating mode. In the present embodiment, the plurality of heating modes, described below, are provided as heating modes in accordance with thickness information of the recording material P. Specifically, the heating modes include a “thin paper mode” recommended for recording materials with a basis weight of not more than 70 g/m$^2$, an “plain paper mode” recommended for recording materials with a basis weight of more than 70 g/m$^2$ and not more than 120 g/m$^2$, and a “heavy paper mode” recommended for recording materials with a basis weight of more than 120 g/m$^2$. In the “heavy paper mode”, by reducing the conveyance speed of the recording material P by half, the toner images on the recording material P can be fixed without excessively raising the temperature of the fixing apparatus 200.

2. Configuration of Fixing Apparatus (Fixing Portion)

Figure 2:
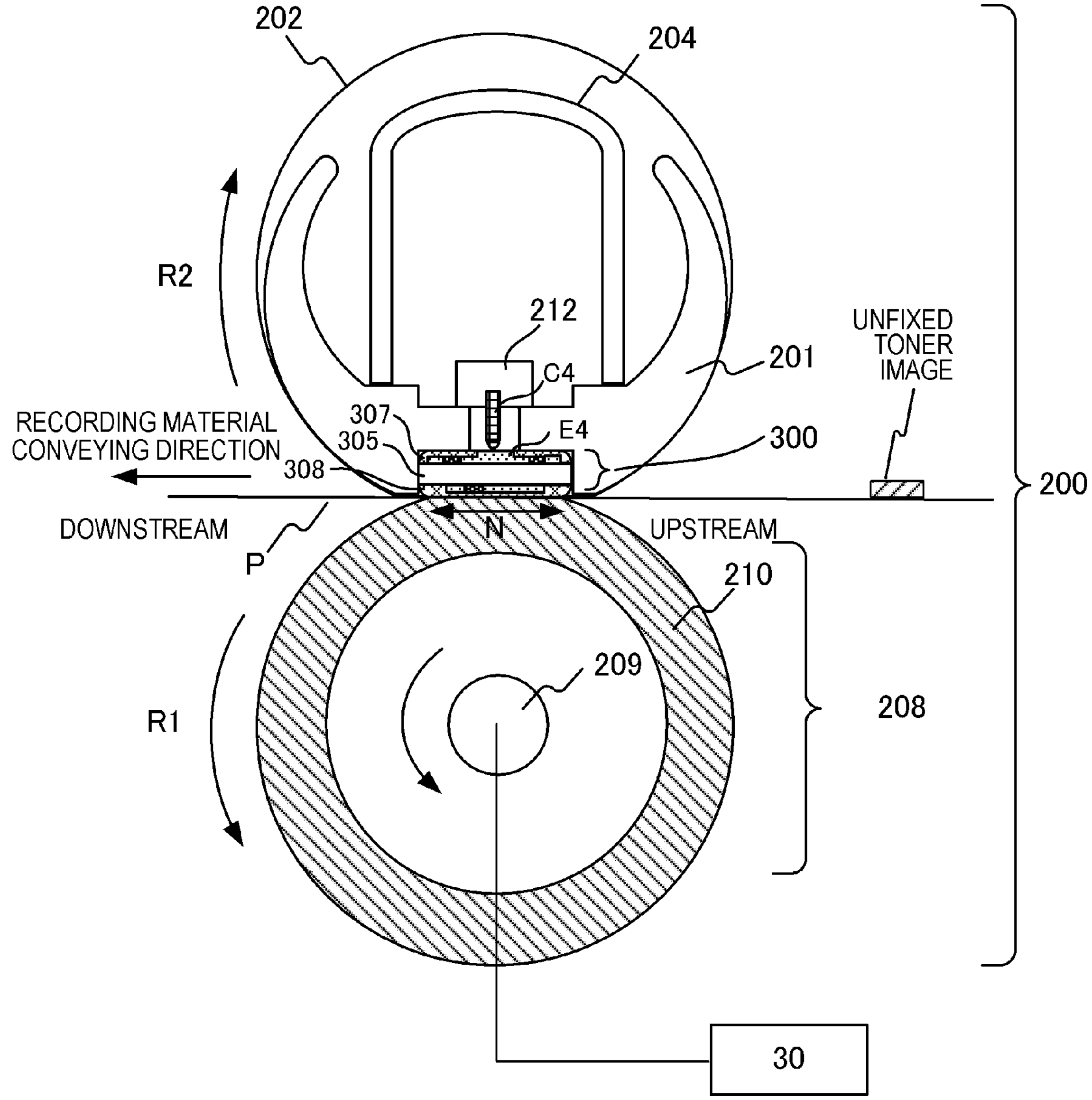
FIG. 2 is a schematic sectional view of a fixing apparatus 200 according to Embodiment 1.

FIG. 2 is a schematic sectional view of the fixing apparatus 200 according to Embodiment 1. The fixing apparatus 200 includes a fixing film 202, a heater 300 in contact with an inner surface of the fixing film 202, and a pressure roller 208 that forms a fixing nip unit N together with the heater 300 via the fixing film 202.

The fixing film 202 is a flexible heat-resistant multilayer tubular film formed in a cylindrical shape, and a heat-resistant resin, such as polyimide with a thickness of around 50 μm to 100 μm, or a metal, such as stainless steel with a thickness of around 20 μm to 50 μm, can be used as a base layer. In addition, a releasing layer for preventing toner adhesion and securing separability from the recording material P is formed on a surface of the fixing film 202. The releasing layer is a heat-resistant resin with superior releasability, such as a tetrafluoroethylene-perfluoro (alkyl vinyl ether) copolymer (PFA) with a thickness of around 10 μm to 50 μm. Furthermore, with a fixing film used in an apparatus that forms color images, in order to improve image quality, heat-resistant rubber, such as silicone rubber with a thickness of around 100 μm to 400 μm and thermal conductivity of around 0.2 W/m·K to 3.0 W/m·K may be provided as an elastic layer between the base layer and the releasing layer. In the present embodiment, from the perspectives of thermal responsiveness, image quality, durability, and the like, polyimide with a thickness of 60 μm is used as the base layer, silicone rubber with a thickness of 300 μm and thermal conductivity of 1.6 W/m·K is used as the elastic layer, and PFA with a thickness of 30 μm is used as the releasing layer.

The pressure roller 208 includes a metal core 209, made of a material such as iron or aluminum, and an elastic layer 210, made of a material such as silicone rubber. The heater 300 is held by a heater holding member 201 made of a heat-resistant resin, and the heater 300 heats the fixing film 202. The heater holding member 201 also has a guiding function for guiding rotation of the fixing film 202. A metal stay 204 receives a pressurizing force from a biasing member, or the like (not shown), and biases the heater holding member 201 toward the pressure roller 208. The pressure roller 208 rotates in a direction of an arrow R1 due to power received from a motor 30. The rotation of the pressure roller 208 is followed by a rotation of the fixing film 202 in a direction of an arrow R2. The unfixed toner image on the recording material P is fixed by applying heat of the fixing film 202 while sandwiching and conveying the recording material P at the fixing nip unit N.

The heater 300 is a heater in which a heat generating resistor, as a heat generating element provided on a ceramic substrate 305, generates heat when energized. The heater 300 includes a surface protection layer 308 that comes into contact with an inner surface of the fixing film 202, and a surface protection layer 307 provided on an opposite side (also referred to as a back surface side) to the side of the substrate 305 on which the surface protection layer 308 is provided (also referred to as a sliding surface side). Power supplying electrodes (an electrode E4 is shown as a representative) are provided on the back surface side of the heater 300. Reference character C4 denotes an electrical contact in contact with the electrode E4, whereby power is supplied from the electrical contact C4 to the electrode E4. Details of the heater 300 will be provided later. In addition, a safety element 212 that is a thermo-switch, a temperature fuse, or the like, and that is actuated by abnormal heat generation of the heater 300 to interrupt power supplied to the heater 300, is arranged so as to oppose the back surface side of the heater 300.

3. Configuration of Heater

Figure 3A:
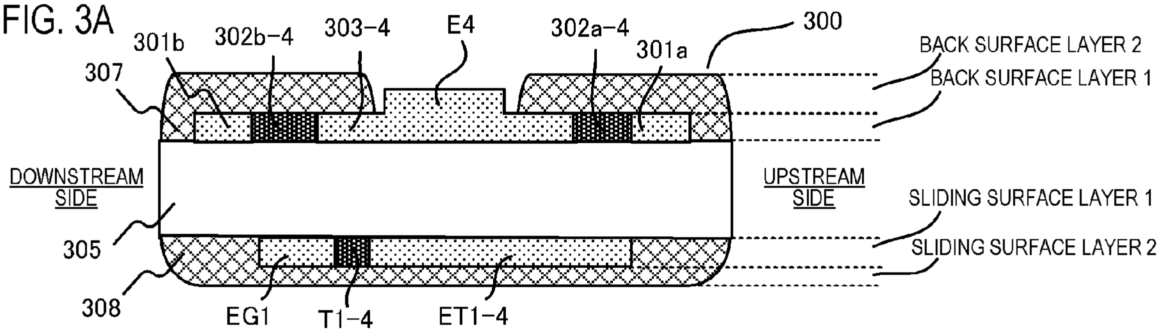
FIGS. 3A to 3C are schematic configuration diagrams of a heater 300 according to Embodiment 1.
Figure 3B:
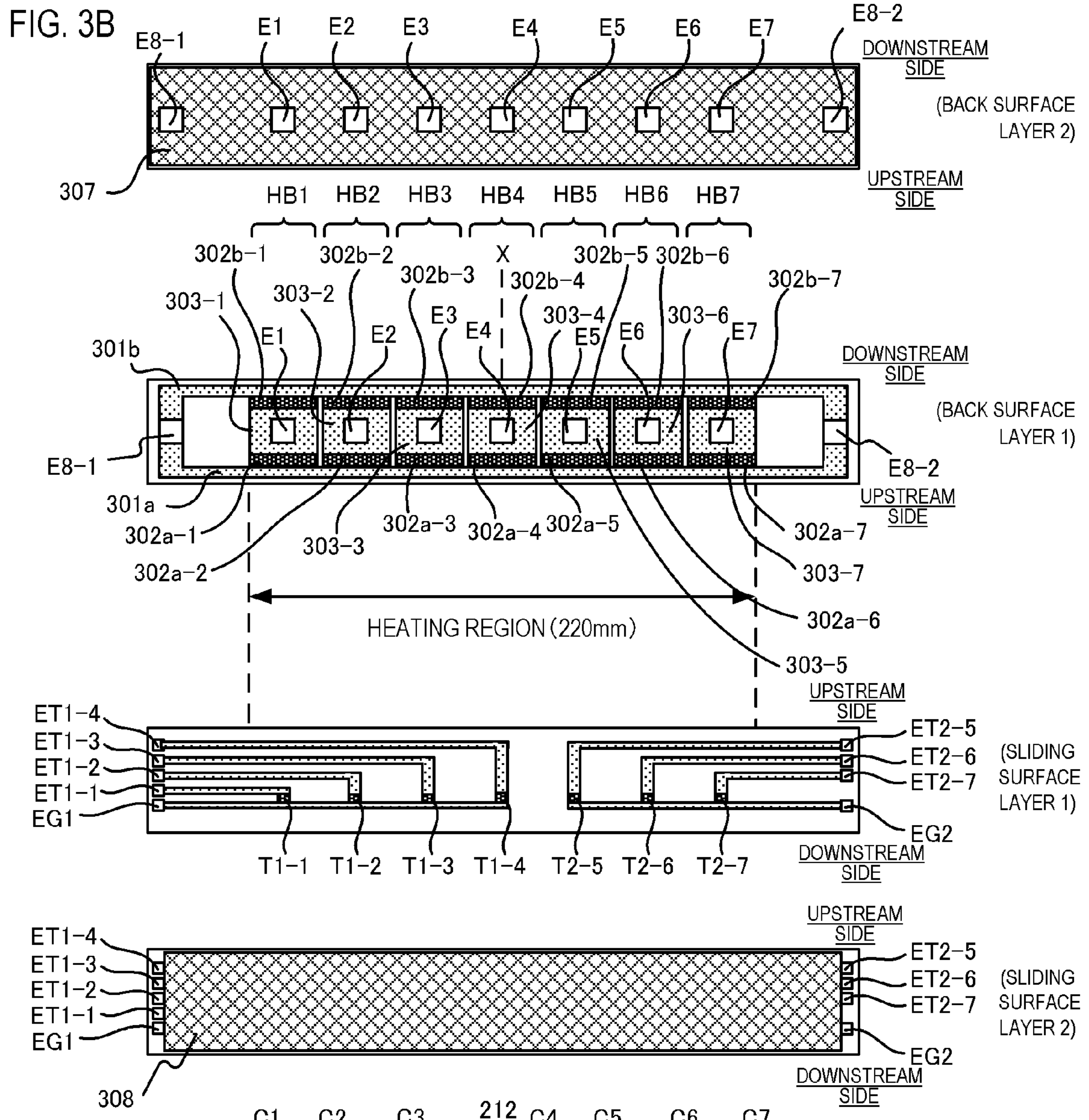
Figure 3C:
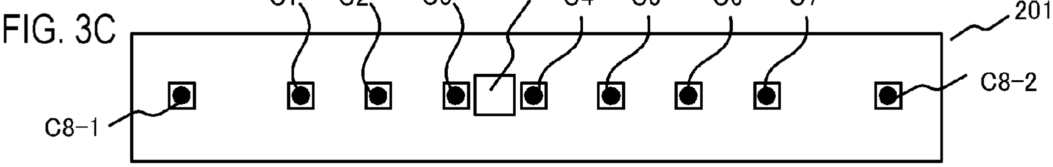

FIGS. 3A to 3C are schematic views showing a configuration of the heater 300 according to Embodiment 1 of the present invention.

FIG. 3A is a sectional view of the heater in a vicinity of a conveyance reference position X shown in FIG. 3B. The conveyance reference position X is defined as a reference position when conveying the recording material P. In the image forming apparatus 100 according to the present embodiment, the recording material P is conveyed so that a central section of the recording material P in a width direction perpendicular to the conveyance direction of the recording material P passes the conveyance reference position X. The heater 300 generally has a five-layer structure in which two layers (back surface layers 1 and 2) are formed on one surface (the back surface) of the substrate 305, and two layers (sliding surface layers 1 and 2) are also formed on the other surface (the sliding surface) of the substrate 305.

The heater 300 has a first conductor 301 (301*a* and 301*b*) provided in a longitudinal direction of the heater 300 on a back surface layer-side surface of the substrate 305. In addition, the heater 300 has a second conductor 303 (303-4 in the vicinity of the conveyance reference position X) provided in the longitudinal direction of the heater 300 at a position in a transverse direction (a direction perpendicular to the longitudinal direction) of the heater 300 that differs from that of the first conductor 301 on the substrate 305. The first conductor 301 is separated into a conductor 301*a* arranged on an upstream side in the conveying direction of the recording material P and a conductor 301*b* arranged on a downstream side in the conveying direction of the recording material P. Furthermore, the heater 300 has a heat generating resistor 302 that is provided between the first conductor 301 and the second conductor 303 and that generates heat due to power supplied via the first conductor 301 and the second conductor 303.

In the present embodiment, the heat generating resistor 302 is separated into a heat generating resistor 302*a* (302*a*-4 in the vicinity of the conveyance reference position X) arranged on the upstream side in the conveying direction of the recording material P, and a heat generating resistor 302*b* (302*b*-4 in the vicinity of the conveyance reference position X) arranged on the downstream side in the conveying direction of the recording material P. In addition, the insulating (in the present example, glass) surface protection layer 307 that covers the heat generating resistor 302, the first conductor 301, and the second conductor 303, is provided on the back surface layer 2 of the heater 300 so as to avoid the electrode unit (E4 in the vicinity of the reference position X).

FIG. 3B shows plan views of the respective layers of the heater 300. A heat generating block made of a set constituted by the first conductor 301, the second conductor 303, and the heat generating resistor 302 is provided in plurality in the longitudinal direction of the heater 300 on the back surface layer 1 of the heater 300. The heater 300 according to the present embodiment has a total of seven heat generating blocks HB1 to HB7 in the longitudinal direction of the heater 300. A heating region ranges from a left end of the heat generating block HB1 in the diagram to a right end of the heat generating block HB7 in the diagram, and a length of the heating region is 220 mm. In the present embodiment, a width in the longitudinal direction of each heat generating block is the same (widths in the longitudinal direction need not, however, necessarily be the same).

The heat generating blocks HB1 to HB7 are respectively constituted by heat generating resistors 302*a*-1 to 302*a*-7 and heat generating resistors 302*b*-1 to 302*b*-7 symmetrically formed in a transverse direction of the heater 300. The first conductor 301 is constituted by the conductor 301*a* that connects to the heat generating resistors (302*a*-1 to 302*a*-7) and the conductor 301*b* that connects to the heat generating resistors (302*b*-1 to 302*b*-7). In a similar manner, the second conductor 303 is divided into seven conductors 303-1 to 303-7 so as to correspond to the seven heat generating blocks HB1 to HB7. A heating amount of each of the seven heat generating blocks HB1 to HB7 is individually controlled by individually controlling power to the heat generating resistors in each block.

Electrodes E1 to E7, E8-1, and E8-2 are connected to electrical contacts C1 to C7, C8-1, and C8-2. The electrodes E1 to E7 are, respectively, electrodes for supplying power to the heat generating blocks HB1 to HB7 via the conductors 303-1 to 303-7. The electrodes E8-1 and E8-2 are common electrodes for supplying power to the seven heat generating blocks HB1 to HB7 via the conductor 301*a* and the conductor 301*b*. While the electrodes E8-1 and E8-2 are provided at both ends in the longitudinal direction in the present embodiment, for example, a configuration may be adopted in which only the electrode E8-1 is provided on one side (in other words, a configuration in which the electrode E8-2 is not provided) or each of the electrodes E8-1 and E8-2 is divided in two in the conveying direction of the recording material.

The surface protection layer 307 of the back surface layer 2 of the heater 300 is formed so as to expose the electrodes E1 to E7, E8-1, and E8-2. Accordingly, a configuration of the heater 300 is realized in which the electrical contacts C1 to C7, C8-1, and C8-2 can be connected to the respective electrodes from the back surface layer-side of the heater 300, and power can be supplied from the back surface layer-side. In addition, a configuration is realized in which power supplied to at least one heat generating block among the heat generating blocks and power supplied to another of the heat generating blocks can be controlled independently.

Thermistors T1-1 to T1-4 and thermistors T2-5 to T2-7 are provided on the sliding surface layer 1 on the side of the sliding surface (a surface on the side in contact with the fixing film) of the heater 300 in order to detect a temperature of each of the heat generating blocks HB1 to HB7 of the heater 300. The thermistors T1-1 to T1-4 and the thermistors T2-5 to T2-7 are made of a material that has a positive temperature coefficient (PTC) property, or a Negative Temperature Coefficient (NTC) property (in this embodiment, an NTC property) and that is thinly formed on a substrate. Since thermistors are provided for all of the heat generating blocks HB1 to HB7, the temperature of all heat generating blocks can be detected by detecting resistance values of the thermistors.

In order to energize the four thermistors T1-1 to T1-4, conductors ET1-1 to ET1-4 for detecting resistance values of the thermistors and a common conductor EG1 of the thermistors are formed. In a similar manner, in order to energize the three thermistors T2-5 to T2-7, conductors ET2-5 to ET2-7 for detecting resistance values of the thermistors and a common conductor EG2 of the thermistors are formed.

The slidable surface protection layer 308 (glass in the present embodiment) is provided on the sliding surface layer 2 on the side of the sliding surface (the surface in contact with the fixing film) of the heater 300. The surface protection layer 308 is formed avoiding both ends of the heater 300 in order to allow electrical contacts to be connected to the conductors ET1-1 to ET1-4 and ET2-5 to ET2-7 for detecting resistance values of the thermistors, and to the common conductors EG1 and EG2 of the thermistors. The surface protection layer 308 is at least provided in a region that slides against the film 202 excluding both ends of a surface of the heater 300 opposing the film 202.

As shown in FIG. 3C, a surface opposing the heater 300 of the heater holding member 201 is provided with holes for connecting the electrodes E1, E2, E3, E4, E5, E6, E7, E8-1, and E8-2 with the electrical contacts C1 to C7, C8-1, and C8-2. The safety element 212, described earlier, and the electrical contacts C1 to C7, C8-1, and C8-2 are provided between the stay 204 and the heater holding member 201. The electrical contacts C1 to C7, C8-1, and C8-2 that are in contact with the electrodes E1 to E7, E8-1, and E8-2 are respectively electrically connected to an electrode section of the heater by a method, such as biasing by a spring or welding. Each electrical contact is connected to the control circuit 400 (to be described later) of the heater 300 via a cable or a conductive material, such as a thin metal plate provided between the stay 204 and the heater holding member 201. In addition, the electrical contacts provided on the conductors ET1-1 to ET1-4 and ET2-5 to ET2-7 for detecting resistance values of the thermistors and the common conductors EG1 and EG2 of the thermistors are also connected to the control circuit 400 to be described later.

4. Configuration of Heater Control Circuit

Figure 4:
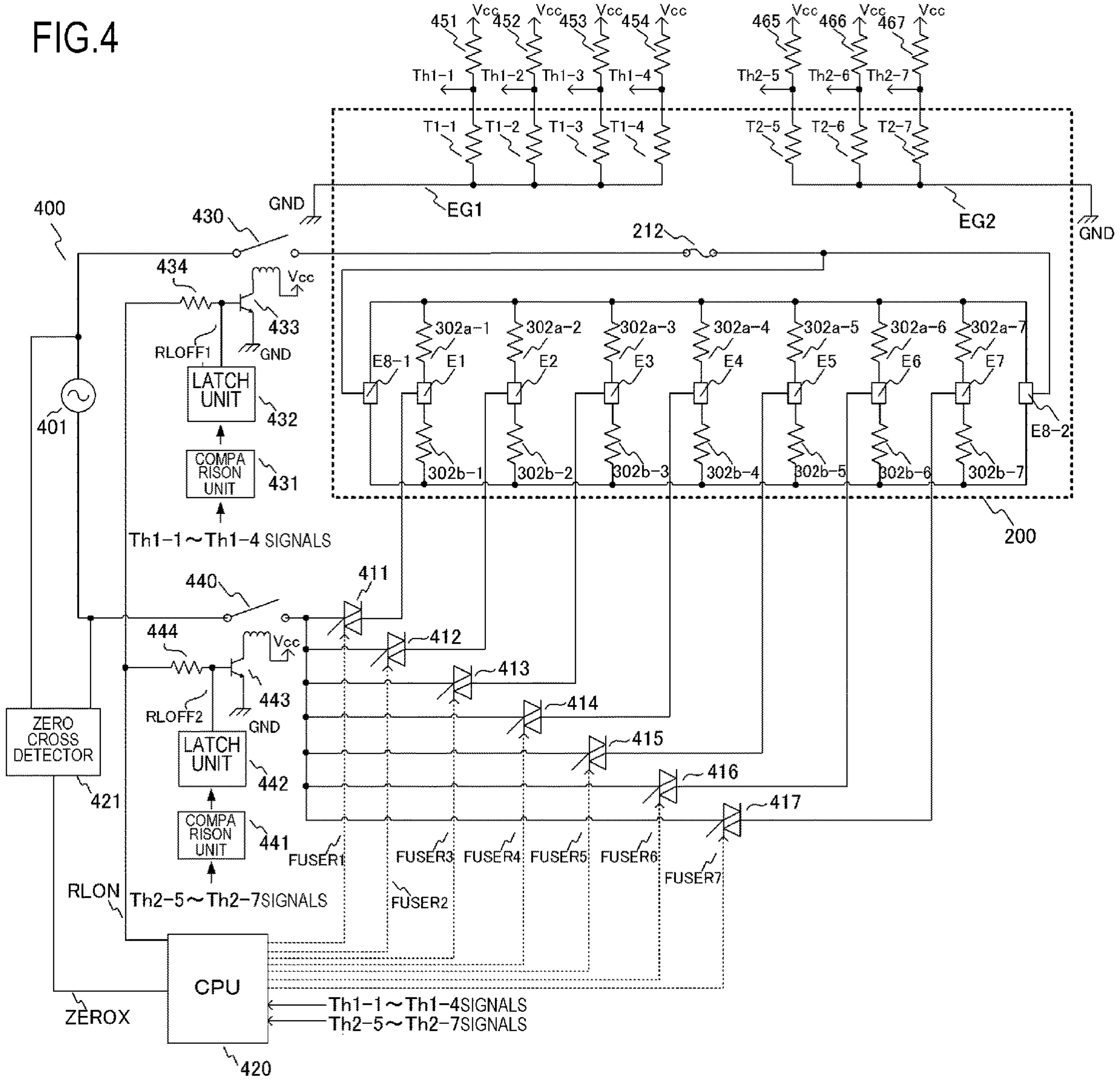
FIG. 4 is a schematic diagram of a heater control circuit 400 according to Embodiment 1.

FIG. 4 is a circuit diagram of the control circuit 400 of the heater 300 according to Embodiment 1. Reference numeral 401 denotes a commercial AC power supply connected to the image forming apparatus 100. Power control of the heater 300 is performed by energizing/interrupting energization of triacs 411 to 417. The triacs 411 to 417 respectively operate in accordance with signals FUSER1 to FUSER7 from a CPU 420. Driving circuits of the triacs 411 to 417 are shown in an abbreviated form. The control circuit 400 of the heater 300 has a circuit configuration that enables the seven heat generating blocks HB1 to HB7 to be independently controlled with the seven triacs 411 to 417. A zero-cross detector 421 is a circuit that detects a zero cross of the AC power supply 401 and that outputs a ZEROX signal to the CPU 420. The ZEROX signal is used for detecting timings of phase control and wave number control of the triacs 411 to 417, and the like.

A method of detecting the temperature of the heater 300 will now be described. For the temperature detected by the thermistors T1-1 to T1-4, a divided voltage of the thermistors T1-1 to T1-4 and resistors 451 to 454 is detected as a signal Th1-1 to Th1-4 by the CPU 420. In a similar manner, for the temperature detected by the thermistors T2-5 to T2-7, a divided voltage of the thermistors T2-5 to T2-7 and resistors 465 to 467 is detected as a signal Th2-5 to Th2-7 by the CPU 420. In internal processing by the CPU 420, power to be supplied is calculated by, for example, PI control based on a set temperature (a control target temperature) of each heat generating block and a detected temperature of a thermistor. Furthermore, a conversion is made to a control level of a phase angle (phase control) or a wave number (wave number control) corresponding to the supplied power, and the triacs 411 to 417 are controlled based on control conditions thereof.

A relay 430 and a relay 440 are used as means to interrupt power to the heater 300 when the temperature of the heater 300 rises excessively due to a failure, or the like. Circuit operations of the relay 430 and the relay 440 will now be described. When a RLON signal assumes a High state, a transistor 433 is switched to an ON state, a secondary-side coil of the relay 430 is energized by a power supply voltage Vcc, and a primary-side contact of the relay 430 is switched to an ON state. When the RLON signal assumes a Low state, the transistor 433 is switched to an OFF state, a current flowing from the power supply voltage Vcc to the secondary-side coil of the relay 430 is interrupted, and the primary-side contact of the relay 430 is switched to an OFF state. In a similar manner, when the RLON signal assumes a High state, a transistor 443 is switched to an ON state, a secondary-side coil of the relay 440 is energized by the power supply voltage Vcc, and a primary-side contact of the relay 440 is switched to an ON state. When the RLON signal assumes a Low state, the transistor 443 is switched to an OFF state, a current flowing from the power supply voltage Vcc to the secondary-side coil of the relay 440 is interrupted, and the primary-side contact of the relay 440 is switched to an OFF state. Moreover, a resistor 434 and a resistor 444 are current-limiting resistors.

Operations of a safety circuit using the relay 430 and the relay 440 will now be described. When any one of the detected temperatures of the thermistors T1-1 to T1-4 exceeds a respectively set prescribed value, a comparison unit 431 operates a latch unit 432 and the latch unit 432 latches an RLOFF1 signal in a Low state. When the RLOFF1 signal assumes a Low state, since the transistor 433 is kept in an OFF state even when the CPU 420 changes the RLON signal to a High state, the relay 430 can be kept in an OFF state (a safe state). Moreover, in a non-latched state, the latch unit 432 sets the RLOFF1 signal to open-state output. In a similar manner, when any one of the detected temperatures of the thermistors T2-5 to T2-7 exceeds a respectively set prescribed value, a comparison unit 441 operates a latch unit 442 and the latch unit 442 latches an RLOFF2 signal in a Low state. When the RLOFF2 signal assumes a Low state, since the transistor 443 is kept in an OFF state even when the CPU 420 changes the RLON signal to a High state, the relay 440 can be kept in an OFF state (a safe state). In a similar manner, in a non-latched state, the latch unit 442 sets the RLOFF2 signal to open-state output.

5. Heater Control Method in Accordance with Image Information

In the image forming apparatus 100 according to the present embodiment, power supply to the seven heat generating blocks HB1 to HB7 of the heater 300 is controlled in accordance with image data (image information) transmitted from an external device (not shown), such as a host computer, and a heating mode selected when printing with the recording material P.

Figure 5:
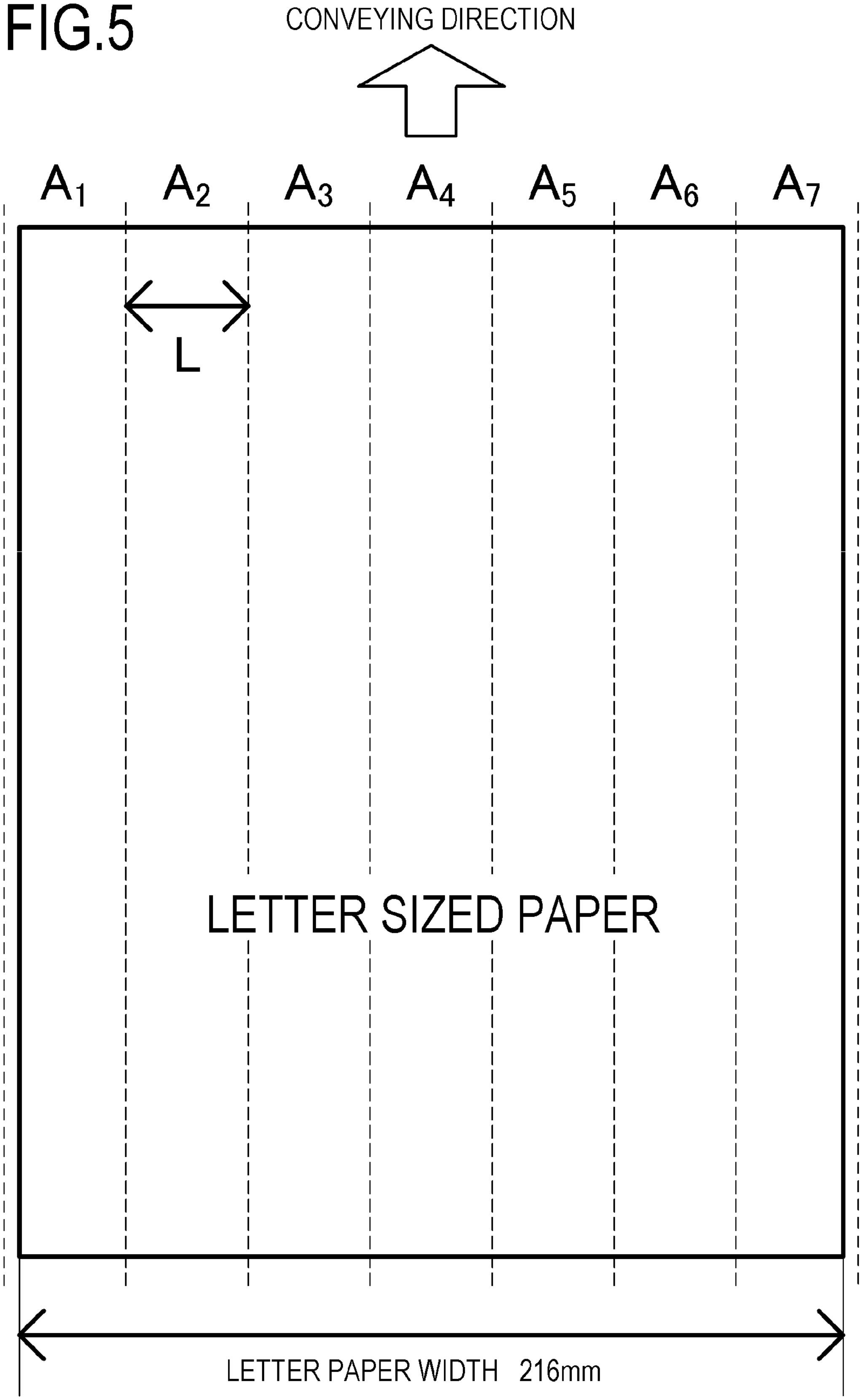
FIG. 5 is a diagram showing heating regions $A_1$ to $A_7$ according to Embodiment 1.

FIG. 5 is a diagram showing seven heating regions $A_1$ to $A_7$ divided in the longitudinal direction according to the present embodiment in comparison with a size of a LETTER size paper. The heating regions $A_1$ to $A_7$ correspond to the heat generating blocks HB1 to HB7 and are configured such that the heating region $A_1$ is heated by the heat generating block HB1 and the heating region $A_7$ is heated by the heat generating block HB7. In other words, the heating regions $A_1$ to $A_7$ represent regions that can be heated by the heat generating blocks HB1 to HB7. In the present embodiment, a total length (a length in a paper-width direction) of the heating regions $A_1$ to $A_7$ is 220 mm, and each of the heating regions $A_1$ to $A_7$ is an equal 7-way division thereof (L=31.4 mm). With respect to the recording material P being conveyed, the heat generating blocks HB1 to HB7 gradually move a heated range from a downstream-side end toward an upstream-side end in the conveying direction (from top toward bottom in FIG. 5).

Figure 6:
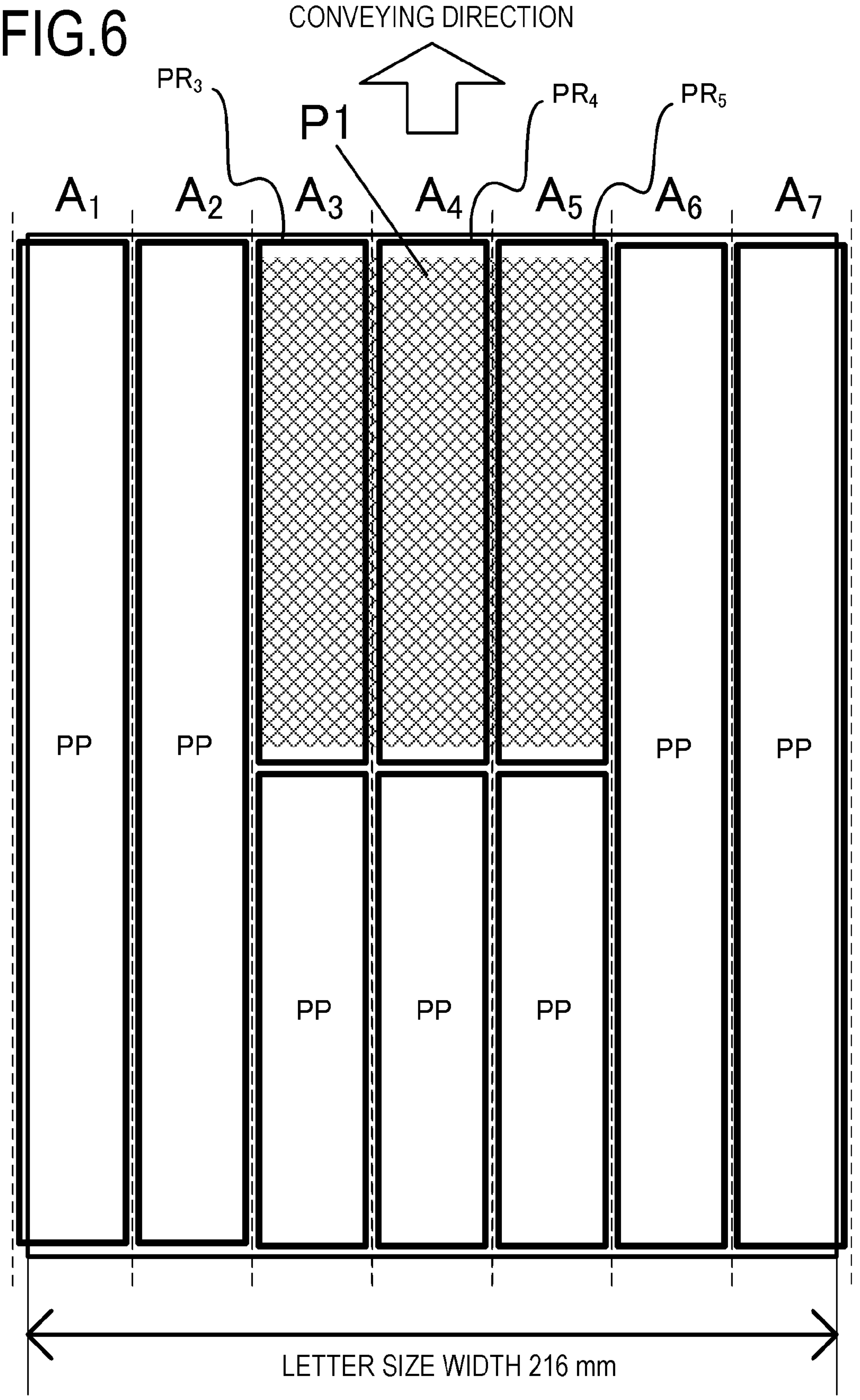
FIG. 6 is a diagram showing an image P1 and an image heating portion PR according to Embodiment 1.

FIG. 6 is a diagram showing an image P1 formed on the recording material P in the present embodiment and an image heating portion PR corresponding to the image P1. The image heating portion PR refers to a section in each of the heating regions $A_1$ to $A_7$ that overlaps with a region in which an image is present on the recording material P. In FIG. 6, sections $PR_3$, $PR_4$, and $PR_5$ overlapping with the image P1 (hatched part) correspond to image heating portions PR. In addition, sections excluding the image heating portions PR in the heating regions $A_1$ to $A_7$ are considered non-image heating portions PP. In the heating regions $A_3$ to $A_5$, portions other than the image heating portions $PR_3$ to $PR_5$ are non-image heating portions PP. Since images are not formed in entire areas in the conveying direction of the heating regions $A_1$, $A_2$, $A_6$, and $A_7$, the entire areas thereof are non-image heating portions PP.

A flow of heater control in the present embodiment will now be described. First, upon receiving image information from a host computer, the video controller 120 calculates a range of the image heating portion PR. When a region of the recording material P corresponding to the image heating portion PR passes the fixing nip unit N, the control portion 113 controls the temperature of each heat generating block, so that an unfixed toner image is fixed onto the recording material P. An image heating temperature (the temperature of a heat generating element when heating an image region) Ta set at this point is set in accordance with the heating mode. The image heating temperature Ta is a control target temperature of a heat generating element (a heat generating block) that heats a region in which an image is formed. In the present example, the image heating temperature Ta is set to 160° C. in the thin paper mode, 180° C. in the thin paper mode, and 180° C. in the heavy paper mode. Moreover, in the heavy paper mode, by reducing the conveyance speed to half the conveyance speed in the plain paper mode, toner images can be fixed even when the image heating temperature Ta is set lower than in the plain paper mode.

When a region of the recording material P corresponding to the non-image heating portion PP passes the fixing nip unit N, the CPU 420 controls the temperature of each heat generating block so that the temperature of the recording material P corresponding to the non-image heating portion PP is less than the temperature of the recording material P corresponding to the image heating portion PR. A non-image heating temperature Tp (the temperature of a heat generating element when heating a non-image region) set at this point is set in accordance with the heating mode. The non-image heating temperature Tp is a control target temperature of a heat generating element (a heat generating block) that heats a region in which an image is not formed. In the present embodiment, the non-image heating temperature Tp is set in the thin paper mode to 140° C. that is less than the image heating temperature Ta by 20° C., 140° C. in the plain paper mode that is less than the image heating temperature Ta by 40° C., and 120° C. in the heavy paper mode that is less than the image heating temperature Ta by 60° C. In other words, in the present embodiment, a temperature difference $\Delta T$ between the image heating temperature Ta and the non-image heating temperature Tp is set such that $\Delta T$=20° C. in the thin paper mode, $\Delta T$=40° C. in the plain paper mode, and $\Delta T$=60° C. in the heavy paper mode. In short, relative to the plain paper mode, the temperature difference $\Delta T$ is set smaller in the thin paper mode and greater in the heavy paper mode.

As described above, the CPU 420 (control portion) respectively sets a heating amount with respect to a region in which an image is formed and a heating amount with respect to a region in which an image is not formed in one sheet of recording material P. In addition, a difference between the heating amount with respect to the region in which an image is formed and the heating amount with respect to the region in which an image is not formed differs depending on a type of recording material P. Specifically, the control portion 420 sets the heating amount with respect to the region in which an image is formed and the heating amount with respect to the region in which an image is not formed, so that, the lesser a basis weight of the recording material P, the lesser the difference between the heating amounts. Moreover, the difference between the heating amounts is created by the control portion 420 providing a difference between the control target temperature of a heat generating element that heats a region in which an image is formed and the control target temperature of a heat generating element that heats a region in which an image is not formed.

In the present embodiment, the video controller 120, as an acquiring unit, acquires thickness or, in other words, a basis weight of the recording material P conveyed to the fixing apparatus 200 as an index value indicating deformability of the recording material P due to the effect of heat. When the acquired basis weight is less than a reference basis weight of a recording material P of a same size or, in other words, when the acquired basis weight is a first basis weight at which the recording material P is more deformable due to the effect of heat than at the reference basis weight, the temperature difference ΔT is set to a first temperature difference that is less than a reference temperature difference. In addition, when the acquired basis weight is greater than the reference basis weight or, in other words, when the acquired basis weight is a second basis weight at which the recording material P is less deformable due to the effect of heat than at the reference basis weight, the temperature difference ΔT is set to a second temperature difference that is greater than the reference temperature difference. In the present embodiment, the reference basis weight as a reference index value is set to 90 g/m$^2$, the first basis weight as a first index value is set to 60 g/m$^2$, and the second basis weight as a second index value is set to 160 g/m$^2$. Furthermore, as prescribed temperature differences ΔT between a control temperature of the image heating portion PR and a control temperature of the non-image heating portion PP, the reference temperature difference is set to 40° C., the first temperature difference is set to 20° C., and the second temperature difference is set to 60° C. Moreover, the specific numerical value settings differ as appropriate depending on the type of the recording material P, apparatus specifications, and the like. In addition, a detected temperature used for temperature control is not limited to the detected temperature of the heater 300 by the thermistor as in the configuration of the present example and the temperature of an arbitrary location in the fixing apparatus 200 other than the heater 300 may be detected to be used for temperature control.

Moreover, while the present embodiment adopts a configuration in which the control temperatures of the image heating portion PR and the non-image heating portion PP are controlled in order to keep a difference in heating amounts between the heating amount of the image heating portion PR and the heating amount of the non-image heating portion PP within a prescribed heating amount difference, this configuration is not restrictive. For example, a difference in power (calculated power consumption) to heat generating elements of the heater 300 may be set between a heat generating element used to heat the image heating portion PR and a heat generating element used to heat the non-image heating portion PP, and energization of each heat generating element may be individually controlled so that the power difference is kept within a prescribed power difference. In doing so, a configuration may be adopted that controls a ratio of power between a heat generating element used to heat the image heating portion PR and a heat generating element used to heat the non-image heating portion PP. In this case, as a reference heating amount difference, a reference power difference or a reference energization ratio may be appropriately set in a similar manner to the reference temperature difference ΔT described above. In addition, as a first heating amount difference and a second heating amount difference, a first power difference or a first energization ratio and a second power difference or a second energization ratio may be appropriately set in a similar manner to the first temperature difference and the second temperature difference described above.

FIG. 7 is a diagram showing a result of an assessment of distortion of each of a plurality of recording materials P having a same size and a different basis weight and a result of a measurement of average power consumption when an image P1 is printed on the recording materials P in respectively recommended heating modes. FIG. 7 shows results for a recording material $P_A$ (basis weight 60 g/m$^2$), a recording material $P_B$ (basis weight 90 g/m$^2$), and a recording material $P_C$ (basis weight 160 g/m$^2$) as LETTER size recording materials with different basis weights. In addition, FIG. 7 also shows an example in which the temperature difference ΔT between the image heating temperature Ta and the non-image heating temperature Tp is fixed, such that ΔT=40° C. regardless of the heating mode as a comparative example to the present embodiment.

In the assessment of distortion of recording materials P, a maximum value of an amount of uplift of a recording material P after printing, when placed on a flat plate, was assessed, with an amount of uplift of not more than 20 mm being "A (acceptable)" and an amount of uplift of more than 20 mm being "U (unacceptable)". In addition, as the average power consumption, average power consumption per sheet when printing 10 sheets of each recording material P was calculated.

As shown in FIG. 7, as for distortion of the recording materials P, printing on the recording material $P_A$ with a basis weight of 60 g/m$^2$ produced a "U" result in the comparative example where ΔT=40° C., but produced an "A" result in the present embodiment where ΔT=20° C. In addition, printing on the recording material $P_B$ with a basis weight of 90 g/m$^2$ and printing on the recording material Pc with a basis weight of 160 g/m$^2$ both produced an "A" result.

The temperature difference ΔT between the image heating temperature Ta and the non-image heating temperature Tp in the present embodiment is set to a value that keeps the distortion of the recording material P within an allowable range. In one sheet of recording material P, a portion with a large heating amount loses more moisture and contracts more than a portion with a small heating amount. Therefore, when there is a variation in heating amounts in one page of the recording material P, uneven stress is created in the page of the recording material P. A state of distortion of the recording material P is determined by a balance between the uneven stress and a firmness or a rigidity of the recording material P. Generally, a recording material P with a small basis weight has low firmness and is, therefore, susceptible to distortion. Therefore, when using a recording material P with a small basis weight, only a small temperature difference ΔT can be set in order to keep distortion of the recording material P within an allowable range. On the other hand, generally, a recording material P with a large basis weight has a high firmness and is, therefore, not susceptible to distortion. As a result, a large temperature difference ΔT can be set.

In addition, according to FIG. 7, a difference in average power consumption due to heating modes increases in the comparative example. In particular, compared to an average power consumption per sheet of 1050 J when printing on the recording material $P_C$ with a basis weight of 160 g/m$^2$, power consumption when using the recording material $P_C$ with a basis weight of 160 g/m$^2$ can be significantly reduced in the present embodiment to an average power consumption per sheet of 850 J.

This is because the greater the basis weight of the recording material P, the greater the amount of heat applied to the recording material P from the fixing apparatus 200 (the greater the basis weight, the greater the power necessary to raise the temperature of the recording material P by 1° C.). In the present embodiment, since the temperature difference ΔT when printing with the recording material $P_C$ that is heavy paper is set such that ΔT=60° C. that is greater than in the comparative example by 20° C., a significant reduction in power consumption can be achieved while keeping the distortion of the recording material P within an allowable range.

While an example in which the rigidity of the recording material P is determined based on a basis weight as thickness information on the recording material P to determine a heating mode is described in the present embodiment, a method of determining a heating mode is not limited to this example. For example, the thickness or the rigidity of the recording material P may be determined by selecting or inputting information on a type of the recording material P (a product name of the recording material P, a product type of the recording material P, including information such as the material, the size, the thickness, and the basis weight, and the like) to determine a heating mode. Since a degree of firmness and an optimal image heating temperature differ depending on the type of recording material P, a similar effect to the present embodiment can be achieved by setting the temperature difference ΔT between the image heating temperature Ta and the non-image heating temperature Tp in accordance with the type of recording material.

As described in the present embodiment, by setting the temperature difference ΔT between the image heating temperature Ta and the non-image heating temperature Tp in accordance with a heating mode when printing with the recording material P, a reduction in power consumption can be achieved while keeping the distortion of the recording material P within an allowable range.

Moreover, while an example in which images formed on the recording material P are concentrated at one location has been described in the present embodiment, images may be scattered at a plurality of locations on the recording material P. In addition, each of the images scattered at the plurality of locations may have a different image heating temperature Ta. In this case, a similar effect to the present embodiment can be achieved by setting a maximum value of the temperature difference ΔT between the image heating temperature Ta and the non-image heating temperature Tp on the recording material P.

Embodiment 2

In Embodiment 2 of the present invention, an example will be described in which the temperature difference ΔT between the image heating temperature Ta and the non-image heating temperature Tp is set after determining a rigidity of the recording material P by detecting characteristics, such as a thickness (a basis weight) of the recording material P, using means for detecting the characteristics of the recording material P. Since the configuration is otherwise similar to that of Embodiment 1, a detailed description thereof will be omitted. It is to be understood that matters not particularly described in Embodiment 2 are similar to those described in Embodiment 1.

In the present embodiment, a media sensor 118 that detects the thickness (the basis weight) of a recording material P is used as recording material thickness detecting means. For example, the media sensor 118 is arranged on a conveyance path of the recording material P between the resist sensor 115 and the transfer roller 108, shown in FIG. 1. The media sensor 118 is a sensor that detects the thickness or the basis weight of the recording material P by a method of emitting light using an LED, or the like, toward the recording material P being conveyed and receiving light transmitted or reflected by the recording material P, a method of transmitting and receiving ultrasound waves, and the like.

Figure 8:
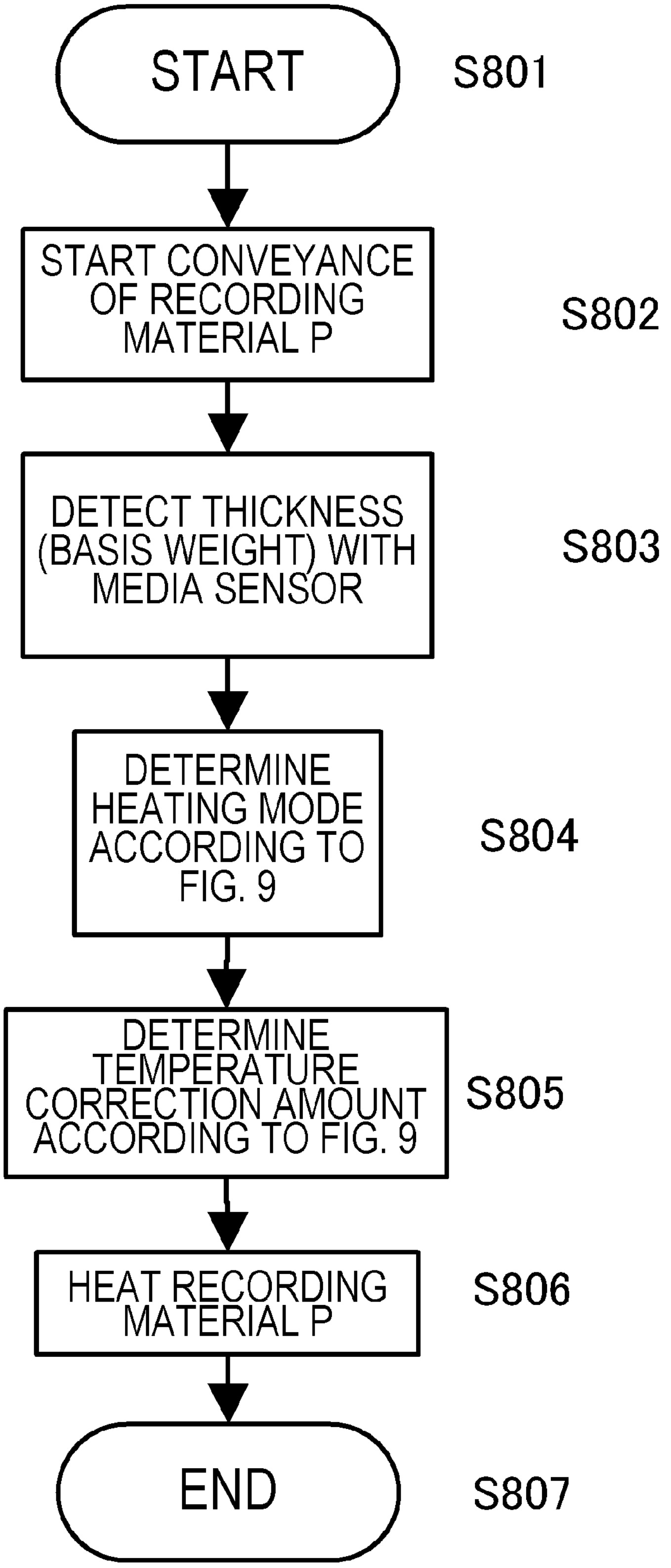
FIG. 8 is a heater control flow chart according to Embodiment 2.

FIG. 8 shows a flow chart according to the present embodiment. In addition, FIG. 9 shows combinations of heating modes and temperature correction amounts in accordance with results of detection by the media sensor. In FIG. 8, first, feeding of the recording material P is started (S802), and, when the recording material P reaches a media sensor unit, the thickness (the basis weight) of the recording material P is detected by the media sensor 118 (S803). In accordance with the detection result, the video controller 120 determines a heating mode with respect to the recording material P (S804), and determines a correction amount dTa1 of the image heating temperature Ta in the determined heating mode and a correction amount dT1 of the temperature difference ΔT from the non-image heating temperature Tp in accordance with FIG. 9 (S805). The control portion 113 uses a corrected image heating temperature Ta'=Ta+dTa1 and a corrected temperature difference ΔT'=ΔT+dT1 to control heating of the recording material P (S806).

Since the lesser the value of the detection result of the thickness (the basis weight) of the recording material P by the media sensor 118, the lesser the firmness of the recording material P, the temperature correction amounts in FIG. 9 are set so as to reduce the temperature difference ΔT of the image heating temperature Ta from the non-image heating temperature Tp to prevent distortion. In addition, since the greater the value of the detection result, the greater the firmness of the recording material P, the temperature correction amounts are set so as to increase the temperature difference ΔT to produce a power saving effect. Since the rigidity of the recording material P can be determined in greater detail by setting the temperature correction amounts as described above, a power saving effect more suitable for the recording material P with various basis weights can be produced while keeping the distortion of the recording material P within an allowable range.

While an embodiment in which temperature correction is performed using fixed values of temperature correction amounts, shown in FIG. 9, depending on in which basis weight range the basis weight detected by the media sensor 118 is included, a control method is not limited thereto. For example, temperature correction may be performed by linearly interpolating the temperature correction amounts, shown in FIG. 9, in accordance with the basis weight detected by the media sensor 118. In addition, while a heating mode and a temperature correction amount are determined solely based on a detection result by the media sensor 118 with respect to the recording material P, a correction method is not limited to such a method. For example, when a type of the recording material P is known in advance, a method may be used in which the temperature difference ΔT is corrected by comparing basic characteristic information of the recording material P as a reference with a detection result by the media sensor 118.

Furthermore, the temperature difference ΔT may be corrected by detecting a degree of hygroscopicity of the recording material P. Specifically, a method may be used in which, by detecting a value of electrical resistance of the recording material P from a transfer current flowing through the recording material P via the transfer roller 108 and comparing the value of electrical resistance with basic characteristic information, a degree of hygroscopicity of the recording material P is estimated to determine the rigidity of the recording material P and to correct the temperature difference ΔT.

Embodiment 3

In Embodiment 3, an example will be described in which the temperature difference ΔT between the image heating portion PR and the non-image heating portion PP is set in accordance with a detection result of atmospheric temperature and humidity in which the fixing apparatus 200 operates. Since the configuration is otherwise similar to that of Embodiment 1, a detailed description thereof will be omitted. It is to be understood that matters not particularly described in Embodiment 3 are similar to those described in Embodiment 1.

In the present embodiment, an environmental sensor 119 that detects atmospheric temperature and relative humidity is used as atmospheric temperature and humidity detecting means. The environmental sensor 119 is a sensor that is arranged at a location that is unaffected by a rise in the temperature inside the image forming apparatus 100 and that detects temperature and humidity of a peripheral environment of the recording material P prior to feeding.

For example, when the recording material P is exposed to atmospheric temperature and humidity of 30° C./80% prior to feeding, an amount of moisture contained in the recording material P increases compared to when exposed to normal temperature and normal humidity (for example, 23° C./50%) and, accordingly, the firmness of the recording material P decreases. In other words, since the firmness or the rigidity of the recording material P differs depending on atmospheric environment, and, particularly, depending on relative humidity RH even when the basis weight of the recording material P is the same, the temperature difference ΔT between the image heating portion PR and the non-image heating portion PP with respect to the recording material P in order to keep distortion of the recording material P within in allowable range also differs.

FIG. 10A shows a temperature correction amount dT2 of ΔT in accordance with the relative humidity RH measured by the environmental sensor 119. The temperature correction amount dT2 is set such that dT2=+10° C. when RH≤30%, dT2=0° C. when RH=60%, and dT2=−10° C. when RH≥90%, and ΔT is corrected using a linearly interpolated temperature correction amount when 30%<RH<60% and 60%<RH<90% (ΔT"=ΔT+dT2). Since the greater the relative humidity, the lesser the firmness of the recording material P, the temperature correction amount dT2 is set so as to reduce the temperature difference ΔT of the image heating temperature Ta from the non-image heating temperature Tp to prevent distortion, and, since the lesser the relative humidity, the greater the firmness of the recording material P, the temperature correction amount dT2 is set so as to increase the temperature difference ΔT to produce a power saving effect. In addition, when an atmospheric temperature T0 differs, due to the difference in temperature of the recording material P prior to feeding, the image heating temperature Ta necessary for fixing a toner image on the recording material P also changes.

In other words, in the present embodiment, the video controller 120 as an acquiring unit acquires temperature and humidity detected by the environmental sensor 119 as index values indicating deformability of the recording material P due to the effect of heat. When the humidity among the acquired temperature and humidity is a greater humidity than a reference humidity, as a reference index value, or, in other words, when the acquired humidity is a first humidity at which the recording material P is more deformable due to the effect of heat than at the humidity in a normal temperature, normal humidity environment, the temperature difference ΔT is set to a first temperature difference that is less than the reference temperature difference. In addition, when the acquired humidity is less than the reference humidity or, in other words, when the acquired humidity is a second humidity at which the recording material P is less deformable due to the effect of heat than at the reference humidity, the temperature difference ΔT is set to a second temperature difference that is greater than the reference temperature difference. In the present embodiment, the reference humidity, as a reference index value, is set to 50% humidity as a representative value of a normal temperature, normal humidity environment. In addition, the first humidity, as the first index value, is set to a humidity of 90% or greater as a representative value of a high temperature, high humidity environment. Furthermore, the second humidity, as the second index value, is set to a humidity of 30% or less as a representative value of a low temperature, low humidity environment. Moreover, the specific numerical value settings and criteria for switching control differ as appropriate depending on the type of the recording material P, apparatus specifications, and the like.

FIG. 10B shows a temperature correction amount dTa2 of the image heating temperature Ta in accordance with the atmospheric temperature T0 measured by the environmental sensor 119. Ta is corrected by a temperature correction amount set such that dTa2=+10° C. when the atmospheric temperature is T0≤10° C., dTa2=+5° C. when T0=15° C., dTa2=0° C. when T0=23° C., and dTa2=−5° C. when T0≥30° C. In addition, Ta is corrected using a linearly interpolated temperature correction amount when 10° C.<T0<15° C., 15° C.<T0<23° C., and 23° C.<T0<30° C. (Ta"=Ta+dTa2). By correcting the image heating temperature Ta in accordance with the atmospheric temperature, an appropriate amount of heat for fixing a toner image can be imparted to an image heating portion PR on the recording material P.

In other words, in the present embodiment, the temperature among the temperature and humidity detected by the environmental sensor 119, as index values indicating deformability of the recording material P due to the effect of heat, is used to correct a control temperature of an image heating portion PR. When the acquired temperature is a greater temperature than a reference temperature, as a reference index value, or, in other words, when the acquired temperature is a first temperature at which the recording material P is more deformable due to the effect of heat than at the temperature in a normal temperature, normal humidity environment, the control temperature of the image heating portion PR is set to a first control temperature that is less than a reference control temperature. In addition, when the acquired temperature is a lower temperature than the reference temperature or, in other words, when the acquired temperature is a second temperature at which the recording material P is less deformable due to the effect of heat than at the reference temperature, the control temperature of the image heating portion PR is set to a second control temperature that is greater than the reference control temperature. In the present embodiment, the reference temperature, as a reference index value, is set to a temperature of 23° C. as a representative value of a normal temperature, normal humidity environment. In addition, the first temperature, as the first index value, is set to a temperature of 30° C. or greater as a representative value of a high temperature, high humidity environment. Furthermore, the second temperature as the second index value is set in two stages to a temperature greater than 10° C. and less than 15° C., and a temperature less than 10° C., as representative values of a low temperature, low humidity environment. Moreover, the specific numerical value settings and criteria for switching control differ as appropriate depending on the type of the recording material P, apparatus specifications, and the like.

As described above, in the present embodiment, the temperature difference ΔT between the image heating temperature Ta and the non-image heating temperature Tp is corrected in accordance with a result of detection of atmospheric temperature and humidity by the environmental sensor 119. Specifically, a setting of a maximum value of an allowable temperature difference ΔT is changed as appropriate in accordance with the detected humidity and a control temperature Ta of an image heating portion PR is increased or decreased from a reference control temperature in accordance with the detected temperature to perform efficient temperature control in a range in which the temperature difference ΔT is kept at or below the maximum value described above. Accordingly, a power saving effect more suitable with respect to various atmospheric environments can be produced while keeping the distortion of the recording material P within an allowable range with respect to various atmospheric environments. Moreover, while an example in which temperature correction is uniformly performed based on a detection result of an environmental sensor 119 has been described in the present embodiment, without describing types of the recording material P and heating modes, different temperature correction amounts may be set depending on types of the recording material P and the heating modes. In addition, since temperature correction can be performed more appropriately by combining a detection result of the environmental sensor 119 according to the present embodiment and a detection result of the media sensor 118 described in Embodiment 2, a power saving effect more suitable with respect to the recording material P with various basis weights in various atmospheric environments can be produced.

Embodiment 4

In Embodiment 4, an example will be described in which the temperature difference ΔT between the image heating portion PR and the non-image heating portion PP is set to each image heating portion PR and a non-image heating portion PP adjacent to each image heating portion PR in accordance with density information of a group of images (also referred to as image density) formed on the recording material P. Since the configuration is otherwise similar to that of Embodiment 1, a detailed description thereof will be omitted. It is to be understood that matters not particularly described in Embodiment 4 are similar to those described in Embodiment 1.

Figure 11:
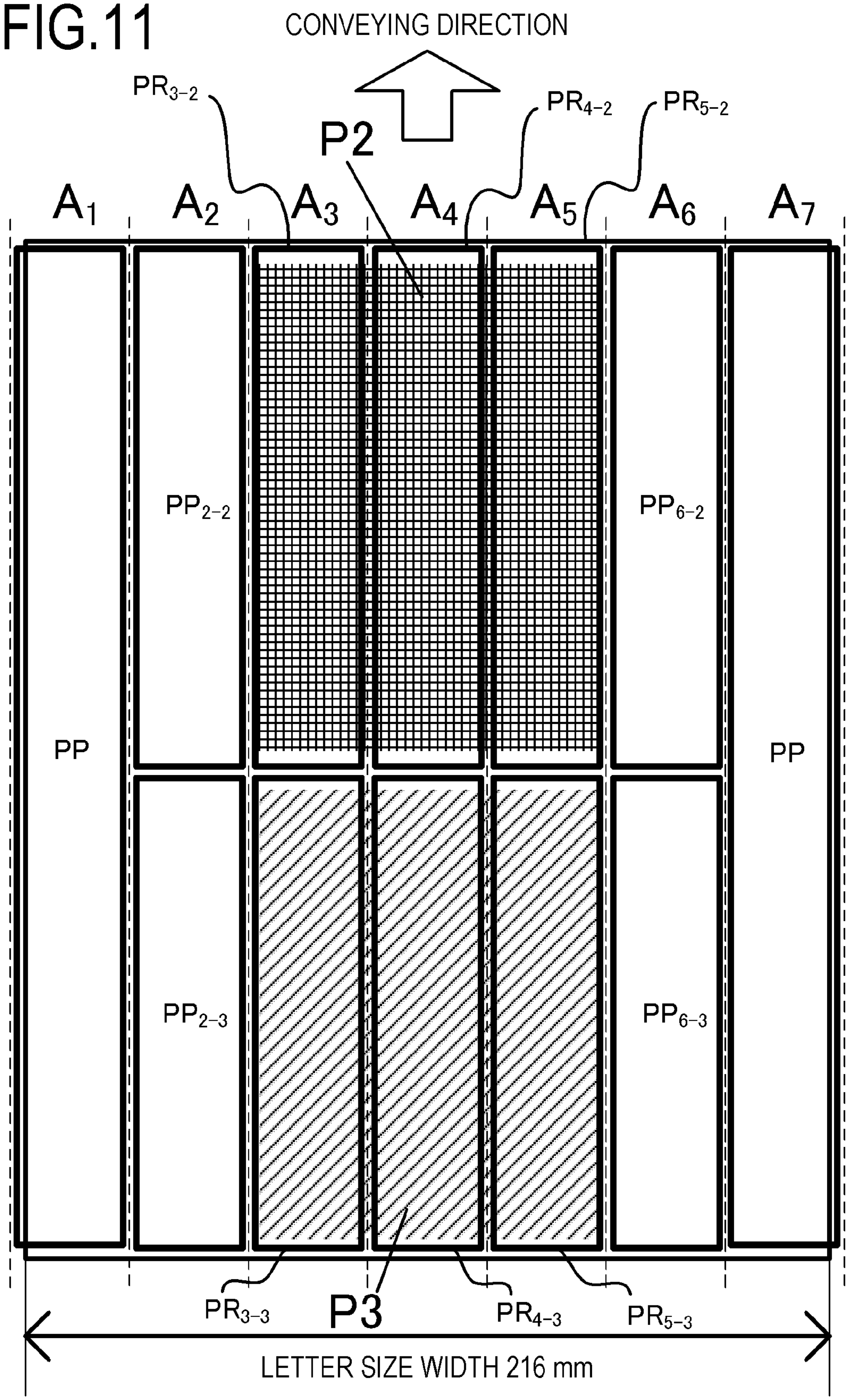
FIG. 11 is a diagram showing an image P2, an image P3, and respective image heating portions thereof according to Embodiment 4.

FIG. 11 is a diagram showing an image P2 and an image P3 formed on the recording material P and image heating portions PR with respect to the respective images according to the present embodiment. In the present embodiment, for the sake of brevity, the image P2 (hatched part) and the image P3 (shadowed part) are respectively assumed to be image data having uniform image density. In addition, it is assumed that the image P2 is formed in the heating regions $A_3$ to $A_5$ on a leading end-side half in the conveying direction of the LETTER size recording material P and that the image P3 is formed in the heating regions $A_3$ to $A_5$ on a trailing end-side half. In this case, the image heating portions PR of the image P2 are assumed to be $PR_{3-2}$ to $PR_{5-2}$ (in bold frame) and the image heating portions PR of the image P3 are assumed to be $PR_{3-3}$ to $PR_{5-3}$ (in bold frame). The non-image heating portions PP adjacent to the image heating portions PR of the image P2 are $PP_{2-2}$ and $PP_{6-2}$ (in bold frame) in the drawing, and the non-image heating portions PP adjacent to the image heating portions PR of the image P3 are $PP_{2-3}$ and $PP_{6-3}$ (in bold frame) in the drawing. The heating regions $A_1$ and $A_7$ are non-image heating portions PP (in bold frame) that are not adjacent to image heating portions PR over their entire areas.

Next, a method of acquiring image density from image data and converting the image density into a toner amount conversion value (%) in an image forming apparatus 100 will be described. Image data from an external device, such as a host computer, is received by the video controller 120 of the image forming apparatus 100, and is converted into bitmap data. In this case, the number of pixels of the image forming apparatus 100 according to the present embodiment is assumed to be 600 dpi, and the video controller 120 creates bitmap data (image density data for each color of CMYK) accordingly. Image density data d(C), d(M), d(Y), and d(K) of the respective colors is expressed in a range of a minimum density 00h (toner amount 0%) to a maximum density FFh (toner amount 100%) in accordance with a degree of occupancy of the respective colors in a unit pixel area (for example, 16×16 dots) for defining density. A total value d(CMYK) of the pieces of image density data is converted into a toner amount conversion value (%) representing a toner amount contained in an image formed on the recording material P. In the present embodiment, a toner amount of 0.5 $mg/cm^2$ on the recording material P is assumed to be 100%. While a toner amount conversion value may exceed 100% when the respective colors are totaled, image density is adjusted so that a toner amount conversion value does not exceed 230%. Moreover, while a case in which a plurality of colors constituting an image are CMYK is described in the present embodiment, the types and number of colors are not limited to this case.

When toner amount conversion values (%), converted from image densities of the image P2 and the image P3 as information values related to the density of an image formed on the recording material P in the present embodiment, are respectively denoted by D2 and D3, a case where D2=200% and D3=100% will now be described. An image heating temperature Ta for fixing a toner image in which D2=200% as a first information value on the recording material P is greater than an image heating temperature Ta for fixing a toner image in which D3=100% as a second information value that is less than the first information value on the recording material P. In the present embodiment, the image heating temperature Ta for fixing a toner image in which D2=200% must be set to be greater than the image heating temperature Ta for fixing a toner image in which D3=100% by 10° C. This is because the greater the toner amount, the greater the amount of heat necessary to sufficiently melt the toner. The greater a temperature difference ΔT between an image heating portion PR and peripheral heated sections thereof, the greater the distortion that occurs on the recording material P. This is because, in a location with a large temperature difference ΔT, a large stress occurs due to a difference in degrees of dehydration from the recording material P. In the present embodiment, in the image P2, as a first image heating portion PR and a first non-image heating portion PP that are adjacent to each other in the longitudinal direction, a boundary between the image heating portion $PR_{3-2}$ and the non-image heating portion $PP_{2-2}$ and a boundary between the image heating portion $PR_{5-2}$ and the non-image heating portion $PP_{6-2}$ are portions where the distortion of the recording material P is particularly large. In addition, in the image P3, as a second image heating portion PR and a second non-image heating portion PP that are adjacent to each other in the longitudinal direction, a boundary between the image heating portion $PR_{3-3}$ and the non-image heating portion $PP_{2-3}$ and a boundary between the image heating portion $PR_{5-3}$ and the non-image heating portion $PP_{6-3}$ are portions where the distortion of the recording material P is particularly large.

In Embodiment 1, it is described that when the image heating temperatures Ta of images scattered at a plurality of locations differ from one another, the effect of the present invention can be achieved by setting a maximum value of the temperature difference ΔT between the image heating temperature Ta and the non-image heating temperature Tp on the recording material P. In other words, the temperature difference ΔT from the non-image heating temperature Tp for keeping a maximum value of the distortion of the recording material P within an allowable range is set using, as a reference, the image heating temperature Ta of the image P2 with the greater image heating temperature Ta among the image P2 and the image P3.

In Embodiment 4, when the image heating temperatures Ta of images scattered at a plurality of locations differ from one another, the temperature difference ΔT from an adjacent non-image heating portion PP is set for each image heating portion PP. In other words, with respect to the image P2, the temperature difference ΔT from the adjacent non-image heating portion $PP_{2-2}$ (and $PP_{6-2}$) with the image heating temperature T2 of the image heating portion $PR_{3-2}$ (and $PR_{5-2}$) as a reference is set to ΔT2 as a first prescribed temperature difference. On the other hand, with respect to the image P3, the temperature difference ΔT from the adjacent non-image heating portion $PP_{2-3}$ (and $PP_{6-3}$) with the image heating temperature T3 of the image heating portion $PR_{3-3}$ (and $PR_{5-3}$) as a reference is set to ΔT3 as a second prescribed temperature difference. The non-image heating portions PP in the heating regions $A_1$ and $A_7$ are set to a lower temperature than the non-image heating portion $PP_{2-2}$ (and $PP_{6-2}$) and, in the present embodiment, are conformed to the non-image heating temperature Tp of the adjacent non-image heating portion $PP_{2-3}$ (and $PP_{6-3}$). The non-image heating portions PP may be set to an even lower temperature in a range in which a maximum value of the distortion of the recording material P is not exceeded.

Since performing heater control as described above enables the temperature of the non-image heating portion PP adjacent to the image heating portion PR of the image P3 with a low image heating temperature Ta to be lowered, a further power saving effect can be obtained while keeping the maximum value of the distortion of the recording material P the same.

While an example in which the image P2 and the image P3 have uniform image density has been described in the present embodiment for the sake of brevity, even when image density is not uniform, the effect of the present embodiment can be achieved as long as image heating temperatures Ta of the image P2 and the image P3 differ from one another. In addition, while an embodiment has been described in which the image P2 and the image P3 are arranged in the same heating regions while being divided into a leading edge half and a trailing edge half in the conveying direction of the recording material P, the concept of the present embodiment can be reflected in various arrangements of a group of images. Therefore, in various arrangements of a group of images, a further power saving effect can be produced while keeping distortion of the recording material P within an allowable range.

According to the present invention, heating control with a high power saving effect can be performed while suppressing deformation of a recording material P.

While the present invention has been described with reference to exemplary embodiments, it is to be understood that the invention is not limited to the disclosed embodiments. The scope of the following claims is to be accorded the broadest interpretation so as to encompass all such modifications and equivalent structures and functions.

I claim:

1. An image heating apparatus that heats an image formed on a recording material, the image heating apparatus comprising:

a heater having a plurality of heat generating elements arranged in a direction orthogonal to a conveying direction of the recording material; and a control portion configured to control electrical power to be supplied to the plurality of heat generating elements so that each of the plurality of heat generating elements is maintained at a target temperature, the control portion being capable of individually controlling each of the plurality of heat generating elements, wherein the control portion is configured (i) to respectively set, for a single sheet of the recording material, the target temperature with respect to a region in which an image is formed and the target temperature with respect to a region in which an image is not formed, as target temperatures, and (ii) to at least set the target temperature with respect to the region in which the image is not formed when the recording material has a first basis weight to be less than the target temperature with respect to the region in which the image is not formed when the recording material has a second basis weight that is less than the first basis weight, so that a difference between the target temperature with respect to the region in which the image is formed and the target temperature with respect to the region in which the image is not formed when the recording material has the first basis weight becomes greater than a difference between the target temperature with respect to the region in which the image is formed and the target temperature with respect to the region in which the image is not formed when the recording material has the second basis weight.

2. An image heating apparatus that heats an image formed on a recording material, the image heating apparatus comprising:

a heater having a plurality of heat generating elements arranged in a direction orthogonal to a conveying direction of the recording material; and a control portion configured to control electrical power to be supplied to the plurality of heat generating elements, so that each of the plurality of heat generating elements is maintained at a target temperature, the control portion being capable of individually controlling each of the plurality of heat generating elements, wherein:

(i) the image heating apparatus is capable of setting at least a thin paper mode and a plain paper mode, (ii) for a single sheet of the recording material, the control portion is configured to respectively set the target temperature with respect to a region in which an image is formed and the target temperature with respect to a region in which an image is not formed, as target temperatures, and (iii) the control portion is further configured to at least set the target temperature with respect to the region in which the image is not formed, in the thin paper mode, when the recording material is thin paper, to be greater than the target temperature with respect to the region in which the image is not formed, in the plain paper mode, when the recording material is plain paper, so that a difference between the target temperatures in the thin paper mode, when the recording material is thin paper, becomes less than a difference between the target temperatures in the plain paper mode, when the recording material is plain paper.

3. An image heating apparatus that heats an image formed on a recording material, the image heating apparatus comprising:

a heater having a plurality of heat generating elements arranged in a direction orthogonal to a conveying direction of the recording material; and a control portion configured to control electrical power to be supplied to the plurality of heat generating elements so that each of the plurality of heat generating elements is maintained at a target temperature, the control portion being capable of individually controlling each of the plurality of heat generating elements, wherein, for a single sheet of the recording material, the control portion is configured to respectively control the target temperature with respect to a region in which an image is formed and the target temperature with respect to a region in which an image is not formed, as target temperatures, and wherein the control portion controls the plurality of heat generating elements so that the target temperature with respect to the region in which the image is not formed when the recording material has a first basis weight is less than the target temperature with respect to the region in which the image is not formed when the recording material has a second basis weight that is less than the first basis weight.

4. An image heating apparatus that heats an image formed on a recording material, the image heating apparatus comprising:

a heater having a plurality of heat generating elements arranged in a direction orthogonal to a conveying direction of the recording material; and a control portion configured to control electrical power to be supplied to the plurality of heat generating elements, so that each of the plurality of heat generating elements is maintained at a target temperature, the control portion being capable of individually controlling each of the plurality of heat generating elements, wherein, for a single sheet of the recording material, the control portion is configured to respectively set the target temperature with respect to a region in which an image is formed and the target temperature with respect to a region in which an image is not formed, as target temperatures, and the control portion controls the plurality of heat generating elements so that the target temperature with respect to the region in which the image is not formed when a basis weight of the recording material is greater than a reference basis weight is less than the target temperature with respect to the region in which the image is not formed when the basis weight of the recording material is less than the reference basis weight.

5. The image heating apparatus according to claim 1, wherein, when the second basis weight is less than a reference basis weight, the control portion sets the target temperatures so that the difference between the target temperatures is less than a reference difference between the target temperatures, and, when the first basis weight is greater than the reference basis weight, the control portion sets the target temperatures, so that the difference between the target temperatures is greater than the reference difference between the target temperatures.

6. The image heating apparatus according to claim 1, further comprising a tubular film that rotates while an inner surface thereof is in contact with the heater, wherein the image on the recording material is heated through the film.

7. An image forming apparatus comprising:

an image forming portion that forms an image on a recording material; and a fixing portion that fixes the image, formed on the recording material, to the recording material, wherein the fixing portion is the image heating apparatus according to claim 1.

8. The image heating apparatus according to claim 1, wherein the control portion sets the target temperatures so that the lesser a basis weight of the recording material, the lesser the difference between the target temperatures.

9. The image heating apparatus according to claim 8, wherein the control portion sets the target temperatures in accordance with a degree of hygroscopicity of the recording material.

10. The image heating apparatus according to claim 8, wherein the control portion sets the target temperatures in accordance with a relative humidity.

11. The image heating apparatus according to claim 10, wherein the control portion sets the target temperatures so that, the greater the relative humidity, the lesser the difference between the target temperatures.

12. The image heating apparatus according to claim 8, wherein the control portion sets the target temperatures in accordance with an image density.

13. The image heating apparatus according to claim 8, wherein the control portion sets the target temperatures in accordance with an atmospheric temperature.

14. The image heating apparatus according to claim 13, wherein the control portion sets the target temperatures so that, the greater the atmospheric temperature, the lesser the difference between the target temperatures.

15. The image heating apparatus according to claim 2, wherein the image heating apparatus is further capable of setting a heavy paper mode, and, when the heavy paper mode is set, the control portion sets the target temperatures so that the difference between the target temperatures is greater than the difference between the target temperatures when the plain paper mode is set.

16. The image heating apparatus according to claim 2, wherein the control portion sets the target temperatures in accordance with a relative humidity.

17. The image heating apparatus according to claim 2, wherein the control portion sets the target temperatures in accordance with an atmospheric temperature.

18. The image heating apparatus according to claim 2, further comprising a tubular film that rotates while an inner surface thereof is in contact with the heater, wherein the image on the recording material is heated through the film.

19. An image forming apparatus comprising:

an image forming portion that forms an image on a recording material; and a fixing portion that fixes the image, formed on the recording material, to the recording material, wherein the fixing portion is the image heating apparatus according to claim 2.

20. The image heating apparatus according to claim 3, further comprising a tubular film that rotates while an inner surface thereof is in contact with the heater, wherein the image on the recording material is heated through the film.

21. The image heating apparatus according to claim 20, further comprising a roller configured to form a fixing nip portion for nipping and conveying the recording material, together with the heater, through the film.

22. The image heating apparatus according to claim 3, wherein the control portion sets the target temperature with respect to the region in which the image is not formed so that a difference between the target temperatures when the recording material has the first basis weight becomes greater than the difference between the target temperatures when the recording material has the second basis weight.

23. The image heating apparatus according to claim 22, wherein the control portion sets the target temperatures so that, the lesser a basis weight of the recording material, the lesser the difference between the target temperatures.

24. The image heating apparatus according to claim 22, wherein the control portion sets the target temperatures in accordance with a relative humidity, so that the greater the relative humidity, the lesser the difference between the target temperatures.

25. The image heating apparatus according to claim 22, wherein the control portion sets the target temperatures in accordance with an atmospheric temperature, so that, the greater the atmospheric temperature, the lesser the difference between the target temperatures.

26. The image heating apparatus according to claim 22, wherein the control portion further controls the target temperature with respect to the region in which the image is formed in accordance with an image density.

27. The image heating apparatus according to claim 4, further comprising a tubular film that rotates while an inner surface thereof is in contact with the heater, wherein the image on the recording material is heated through the film.

28. The image heating apparatus according to claim 27, further comprising a roller configured to form a fixing nip portion for nipping and conveying the recording material, together with the heater, through the film.

29. The image heating apparatus according to claim 4, wherein the control portion sets the target temperature with respect to the region in which the image is not formed so that a difference between the target temperatures when the basis weight of the recording material is greater than the reference basis weight is greater than the difference between the target temperatures when the basis weight of the recording material is less than the reference basis weight.

30. The image heating apparatus according to claim 29, wherein the control portion sets the target temperatures in accordance with a relative humidity, so that, the greater the relative humidity, the lesser the difference between the target temperatures.

31. The image heating apparatus according to claim 29, wherein the control portion sets the target temperatures in accordance with an atmospheric temperature, so that, the greater the atmospheric temperature, the lesser the difference between the target temperatures.

32. The image heating apparatus according to claim 29, wherein the control portion further controls the target temperature with respect to the region in which an image is formed in accordance with an image density.

* * * * *